United States Defensive Publication [19] (H) [11] T995,007

Mann [43] Jun. 3, 1980

[54] COATED FILM ASSEMBLIES

[75] Inventor: David R. Mann, Essex, England

[73] Assignee: Bexford Limited, London, England

[21] Appl. No.: 33,496

[22] Filed: Apr. 26, 1979

Related U.S. Application Data

[63] Continuation of Ser. No. 723,902, Sep. 16, 1976.

[30] Foreign Application Priority Data

Aug. 16, 1976 [GB] United Kingdom ..... 33964/76

[51] Int. Cl.[3] ..... G03C 1/80

[52] U.S. Cl. ..... 430/630; 430/937

[57] ABSTRACT

Photographic film bases and sensitized photographic films are produced by coating a supporting film, especially a linear polyester film such as a biaxially oriented and heat-set film of polyethylene terephthalate, with a subbing composition comprising a polymer of a vinyl halogenoester, such as vinyl mono-, di-, or trichloroacetate, which is then subjected to a surface modifying, e.g. corona discharge, treatment. Light-sensitive photographic emulsions adhere directly to the treated subbing layer without the need for an intermediate gelatin subbing layer. The vinyl halogenoester subbing polymer may be a copolymer formed with a softening temperature-lowering comonomer such as an alkyl acrylate, alkyl methacrylate, polyalkylene oxide itaconate or maleate, vinyl alkyl ether, vinyl ester, alkene, alkadiene or alkyl styrene, a suitable copolymer being 78/15/7 mole % vinyl monochloroacetate/ethyl acrylate/acrylamide.

24 Claims, No Sheets Drawing,

17 Pages Specification

The file of this unexamined application may be inspected and copies thereof may be purchased (849 O.G. 1221, Apr. 9, 1968).